United States Patent [19]

Curtin et al.

[11] Patent Number: 4,727,357

[45] Date of Patent: Feb. 23, 1988

[54] COMPACT KEYBOARD SYSTEM

[75] Inventors: William J. Curtin; Stephen Soto; John Morley; Nora Curtin, all of Madison, Wis.

[73] Assignee: Amtel Communications, Inc., Madison, Wis.

[21] Appl. No.: 618,681

[22] Filed: Jun. 8, 1984

[51] Int. Cl.[4] .................................................. G06F 3/02
[52] U.S. Cl. ........................... 340/365 P; 340/365 R; 340/756
[58] Field of Search ............ 340/365 P, 365 S, 365 R, 340/365 C, 365 VL, 711, 712, 707, 790, 756, 758; 364/189, 700, 709, 705; 200/5 R, 5 A, 5 B, 5 C, 5 D, 5 E; 400/70; 382/57, 37, 38

[56] References Cited

U.S. PATENT DOCUMENTS

| | | | |
|---|---|---|---|
| 3,760,373 | 9/1973 | Bartz | 340/707 |
| 4,005,400 | 1/1977 | Engdahl | |
| 4,159,471 | 6/1979 | Whitaker | |
| 4,224,615 | 9/1980 | Penz | 340/712 |
| 4,400,699 | 8/1983 | Glasmacher | 340/365 C |
| 4,484,180 | 11/1984 | DeForeit | 340/365 R |
| 4,527,917 | 7/1985 | Ueno | 340/365 R |

Primary Examiner—John W. Caldwell, Sr.
Assistant Examiner—Mahmoud Fatahi-yar
Attorney, Agent, or Firm—Lowe, Price, LeBlanc, Becker & Shur

[57] ABSTRACT

A compact keyboard for entry of alphanumeric data or other characters into a computerized system. A character formation key on the keyboard is formed by a plurality of bars which are capable of being activated for providing light. These bars are arranged in a mosaic pattern with several of the bars forming an outer box pattern and several of the bars extending inside of the box pattern. Light is emitted from each bar when such bar is in an activated lit condition. Each of the bars is switchable between an activated lit condition and an off condition, with the activated bars emitting light so as to display an alphanumeric character. The keyboard has a data entry mechanism for causing the displayed alphanumeric character to be entered into a computerized system.

41 Claims, 6 Drawing Figures

COMPACT KEYBOARD SYSTEM

BACKGROUND OF THE INVENTION

The present invention relates to a compact keyboard system.

With the rapidly expanding developments of small computer systems, there has been an ever increasing demand for reducing the overall size of the computer system as well as the keyboard for entering data into the system. While the size of the computer system has been substantially reduced so that small computers can fit within a briefcase or a large jacket pocket, problems have arisen as far as the practicality of use of the keyboards on such computers. These various pocket size or small computers for briefcases have used a full set of keys on a keyboard but have substantially reduced the size of such keys. The small size of these keys has rendered it difficult to only actuate a single key for entering data when using the keyboard.

While a full keyboard with all keys and punctuation marks of a size sufficiently large for enabling information to actually be typed into the computer system is desirable for some types of operation, if the amount of information to be entered into the computer system is limited in nature then a full size keyboard for regular typing is unnecessary. The primary concern in this type of situation becomes the case and speed with which data can be entered into the computer system.

Various types of coded key formats have been developed for enabling codes representative of different alphanumeric characters to be entered into a computer system using a single key structure. Exemplary of such systems are those systems disclosed in U.S. Pat. No. 4,005,400 to Engdahl and U.S. Pat. No. 4,159,471 to Whitaker.

In the patent to Engdahl, a small data entry screen is provided on a portion of a watch surface. This data entry screen primarily consists of four pressure sensitive quadrants. By writing information across such quadrants in a particular order, it is possible to enter various numbers of 0 through 9. As indicated in the patent, by carefully writing the various numbers in a particular pattern each of the four quadrants will be activated in a particular different order thereby providing a coded signal corresponding to each of the different numbers of 0 through 9. In this manner, a numerical code can be entered through this data entry screen on the watch.

In the patent to Whitaker, special codes have been developed for each letter of the alphabet and for various punctuation marks. By writing these special codes on a data entry screen, which screen consists of four pressure sensitive quadrants, alphanumeric data can be entered into a computer system. In the operation of this system disclosed by the patent to Whitaker, one must remember the specific codes representing each character and punctuation mark or alternatively must continually refer to a chart showing the code for each of the alphanumeric characters and punctuation marks.

Other types of systems for enabling the entry of written data have been developed within the art. Exemplary of such other types of systems is the drawing board disclosed in U.S. Pat. No. 3,618,029 to Graven. The patent to Graven discloses an array of light-emitting light-sensing members which can be activated by a stylus for entering different codes representing different data to be entered into the computer system.

In addition, various types of optical displays utilizing a series of light-emitting bars or segments have been extensively developed within the art. These displays provide for the display of alphanumeric characters based upon which bars are activated for emitting light. Exemplary of these types of display systems are those disclosed in U.S. Pat. Nos. 3,495,232 to Wagner, 4,220,948 to Trame, and 4,224,615 to Penz. The patents to Wagner and Penz both disclose LCDs in which each character is formed by a series of lighted bars; these bar patterns have an outer box structure along with a plurality of bars extending within the box. These LCD display bars, however, only provide a display of information entered through another source within the system and are not utilized for enabling the entry of data. The patent to Trame discloses the formation of various characters using a 7-segment set of shutters; again this system is merely a display system and not utilized for the entry of data into a computer system.

SUMMARY OF THE INVENTION

An object of the present invention is to provide an improved compact keyboard system for facilitating the energy of alphanumeric data into a computer system.

Another object of the present invention is to provide a compact keyboard system for enabling the entry of alphanumeric data where the keyboard structure is formed by a plurality of bars capable of being activated in a particular alphanumeric pattern for the entry of the desired data.

A further object of the present invention is to provide a small compact keyboard having a single key structure formed by a plurality of bars for enabling these bars to be lit in a particular pattern for the entry of data into the computer system through the compact keyboard.

These objectives are achieved by the compact keyboard of the present invention. This compact keyboard is used for entering alphanumeric data into a computerized system. The keyboard of the present invention enables alphanumeric characters and if desired punctuation marks to be entered on the keyboard and enables such data to then be transferred either through a modem to a transmitter on a telephone or through a serial port connection to a system for transferring the information to a computer system.

The compact keyboard of the present invention has a character formation key which is formed by a plurality of bars capable of being activated for providing light. These bars which form the character formation key are arranged in a mosaic pattern with several of the bars forming an outer box pattern and several of the bars extending inside of this box pattern. A mechanism is provided for causing each of the bars to emit light when such bar is in an activated lit condition. Each of the bars is switchable between its activated lit condition and an off condition with the activated bars emitting light so as to display an alphanumeric character. In accordance with the preferred embodiment, either all or at least some of the bars are normally activated and hence emit light; during use of this embodiment when forming characters the necessary bars are deactivated, i.e. turned off, so that the remaining lit bars form the desired alphanumeric character. Once the desired alphanumeric character is formed, a data entry key is activated for causing the displayed alphanumeric character to be entered into the computer system.

In accordance with the preferred embodiment, each of the bars is switchable between its activated and its off control by a user contacting each individual bar. An initiating mechanism can cause the normal condition of at least several of these bars to be in their activated condition. In such normally activated condition such bars emit light so that when entering characters on the keyboard a user contacts selected normally activated bars to turn off their lights. It has been found in developing the present invention that the alphanumeric characters can be more rapidly formed by placing at least the bars forming the outer box pattern and possibly the bars extending horizontally across such box pattern in a normally activated condition. In this manner, it normally takes fewer key strokes to form each alphanumeric character, at least those characters that are most often entered such as the vowels, A, E, I, O and U. Once the displayed alphanumeric character has been entered into the computer system to which the keyboard is coupled, the data entry key causes a reinitiating operation so that the bars are returned to their normal conditions.

To facilitate and speed up the process of entering the desired alphanumeric characters through the keyboard into the computerized system, in accordance with the preferred embodiment of the present invention a best guess display mechanism is provided. In accordance with this best guess display mechanism, as the bars of the key are activated, or deactivated if such bars are normally lit, an analysis is made based upon the bars that are lit as to which characters the user of the keyboard is most likely attempting to form. In making this analysis, the factors taken into consideration can be the bars that are actually lit and if desired a probability weighting factor can be added in so that the best guess characters displayed are those characters that are most often formed, e.g. vowels, certain letters of the alphabet or certain characters that historically have been most often formed by the user of the keyboard. Each of these best guess characters is displayed on a separate character display member. For example, if the bars forming the outer box pattern of the key and the bars forming the inner horizontal line of the key are lit then the best guess characters displayed could include B, D, O, and A.

The number of separate character display members can be any desired number although in accordance with the preferred embodiment four such displays are provided. If any of these separate character display members displays the desired alphanumeric character that the user intends to enter then a separate data entry key associated with such separate character display member that displays the desired alphanumeric character can be activated by the user thereby immediately entering this displayed alphanumeric character, which is one of the best guess characters selected by the analyzing mechanism of the keyboard.

The analyzing mechanism is formed by a one chip microprocessor such as a Z8 from Zilog, which has its own built-in RAM and ROM. The microprocessor can constantly update the best guess alphanumeric characters displayed each time the condition of any of the bars of the key is changed by the user of the keyboard. Consequently, each time the user changes the condition of any of the bars the best guess characters based upon the particular bars then activated are displayed on the separate character display members.

In accordance with the preferred embodiment of the keyboard of the present invention, each of the bars has an associated lamp which provides backlighting to the bar for generating a light behind the bar that shines through the bar. There are preferably sixteen of these backlit bars.

A separate punctuation generating mechanism also can be provided on the keyboard. While there are some punctuation marks such as a slash that can be formed by the bars, most of the punctuation marks can not be generated by the bars of the key. Consequently, it is possible to include on the keyboard two punctuation generating members. The first punctuation generating member can be a period which when pressed will display on the four separate character display members the following punctuation marks: ".", ":", "!" and "?". The second punctuation key is a comma which when pressed results in the display on the four separate character displays of the following punctuation marks: ",", ";","@" and "&".

Finally, it is also possible to use the keyboard of the present invention for forming and entering both upper and lower case characters. For this purpose, a shift/lock key can be provided for shifting between the upper and lower case characters.

A separate display screen can be provided on one side of the keyboard for displaying the characters that have been entered. This display screen can display several characters that have been entered, for example the last ten or twenty characters or if the screen is made large then several lines of data can be displayed.

In accordance with the preferred embodiment, there are 16 bars provided for forming the mosaic pattern of the character formation key. There are also two alternative embodiments for the character formation key. The first alternative includes the addition of a seventeenth member located at the center of the bar mosaic pattern. The second alternative is to utilize a single bar member along the three horizontal lines: top, middle and bottom.

In an alternative embodiment of the present invention, the bars that form the character formation key can be activated by a separate set of keys instead of the user actually contacting the bars themselves. For example, it is possible to ascribe a two-digit numerical code to each of the bars of the character formation key and by entering these codes each of the bars can be either activated or deactivated so as to turn on the light associated with such bar. In another alternative embodiment of the keyboard of the present invention, while the switching is accomplished by the user contacting the bars of the character formation key, the lights themselves do not emit light through the bars but instead the pattern of the bars which are activated result in a character pattern appearing on a separate display member. The character pattern on this display member is dependent upon the bars of the character formation key that are actuated.

Alternative arrangements for activating the bars of the character formation key can be utilized. Such alternative arrangements could include the use of a light pen, joystick, mouse, touch screen or voice commands for activating the various bars of the character formation key. With such alternative arrangements, the bar pattern alternatively can be a pictorial pattern displayed on a display member with each of the bars of the display being activated or deactivated by an appropriate command signal. If a voice activated system is used, then the user can either provide a number indicating a particular bar to be activated or can say the actual alphanumeric character with the system then providing the best guess interpretation of the voice command.

While the keyboard of the present invention is primarily utilized for entering alphanumeric characters, the keyboard can be used for entering other types of characters, e.g. *, +, − and graphic symbols. In entering such information, the character or symbol that is formed on the keyboard is the actual character to be entered into the computer system.

DESCRIPTION OF THE PREFERRED EMBODIMENT

Figure 1:
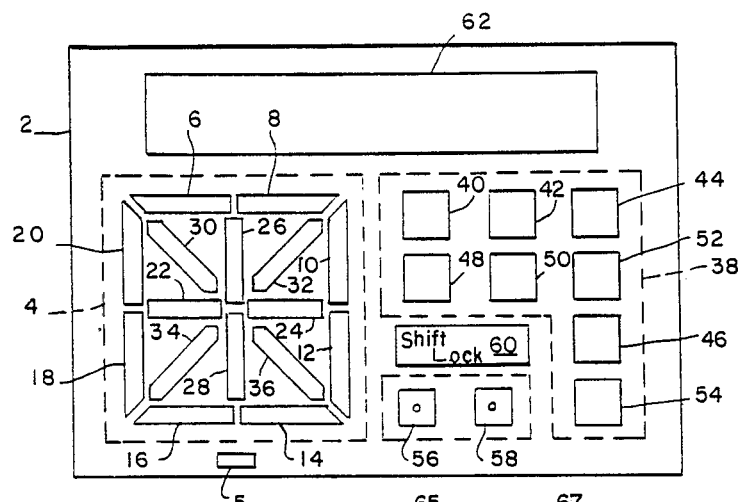
FIG. 1 is a front plan view of a compact keyboard in accordance with the present invention.

A compact keyboard system 2 in accordance with the present invention is shown in FIG. 1. This compact keyboard system includes a character formation key 4. This character formation key is made up of 16 bars, bars 6 through 36. Each of these bars when activated emits light from a light emitting member located behind the bar which light emitting member is turned on when the bar is activated. During normal operation, bars 6, 8, 10, 12, 14, 16, 18 and 20 forming an outer box pattern of character formation key 4 are normally lit. In addition, inner horizontal bars 22 and 24 may be normally lit. When a user desires to enter an alphanumeric character, any of the normally lit bars that should not be lit are contacted so as to turn off the lighting for such bar and any of the normally unlit bars that should be lit are contacted so as to activate such bars. The character displayed by the lit bars can be entered by activating data entry key 5.

Once operation of the keyboard is commenced, as the user begins to contact different bars, a microprocessor controlled system within the keyboard system displays the four best guesses of the alphanumeric character being formed by the user. These four displays are presented on display members 40, 42, 44 and 46 of the best guess display and entry section 38. The best guesses of the character that the user intends to form is determined based upon analyzing: (1) the particular bars of character formation key 4 that are activated, (2) a probability weighting factor which takes into consideration that some letters are more likely to occur than others such as vowels are more likely to occur than certain other letters, and (3) an historical analysis based upon alphanumeric characters recently entered by the user which might determine for example that the particular user enters more s's than p's. This analysis is determined by a computer program within the microprocessor controlled system.

If one of the displays on display members 40, 42, 44 and 46 is the alphanumeric character that the user intends to form then an associated data entry key, one of keys 48, 50, 52 and 54, is contacted by the user so as to cause the character displayed on the separate display members to be entered by the keyboard system into the computerized system to which the keyboard is coupled.

Compact keyboard system 2 can be coupled to a telephone modem such as an acoustic modem. If such a modem is provided, then the keyboard system 2 can be used for entering data which then can be coupled through the telephone system to a computer system by such modem which transmits the information over the telephone lines. With such an arrangement, the keyboard system can be used for enabling a user to enter a password or several passwords into a computerized system through a telephone line so as to obtain information out of the computerized system once the password or words are recognized by the system. Thus, the keyboard system of the present invention can be used for enabling a user to enter a password over the telephone lines to a computerized telephone message system which once the password is received will transmit to the user over the same telephone line any messages for such user. These messages can be transmitted to the user through the same modem to which the keyboard system 2 is attached so that keyboard system 2 then displays on a display screen 62 any messages received over the telephone line. This display screen 62 also shows the series of characters entered by the user when operating keyboard system 2.

Character formation key 4 can be used for entering either upper case or lower case letters. For shifting between upper case and lower case letters a shift/lock key 60 is provided. In order to enable punctuation marks which can not be formed on the bar patterns of character formation key 4 to be entered through the keyboard system 2, two punctuation keys, keys 56 and 58 are provided. Punctuation key 56 is a period key which generates a series of different punctuation marks that utilize a period. Thus, when punctuation key 56 is contacted by the user, the following four punctuation marks can be caused to appear on display members 40, 42, 44 and 46: ".", ":", "!" and "?". When punctuation key 58 is contacted by the user, the following four punctuation marks can be displayed: ",", ";", "@" and "&".

Figure 2:
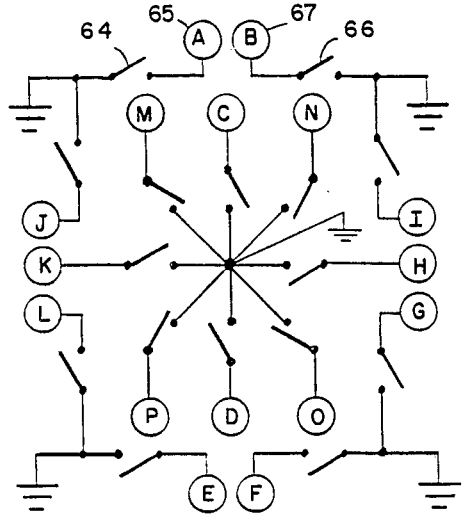
FIG. 2 is a schematic diagram of the switch members associated with each of the bars of the key of the keyboard of the present invention.
Figure 4:
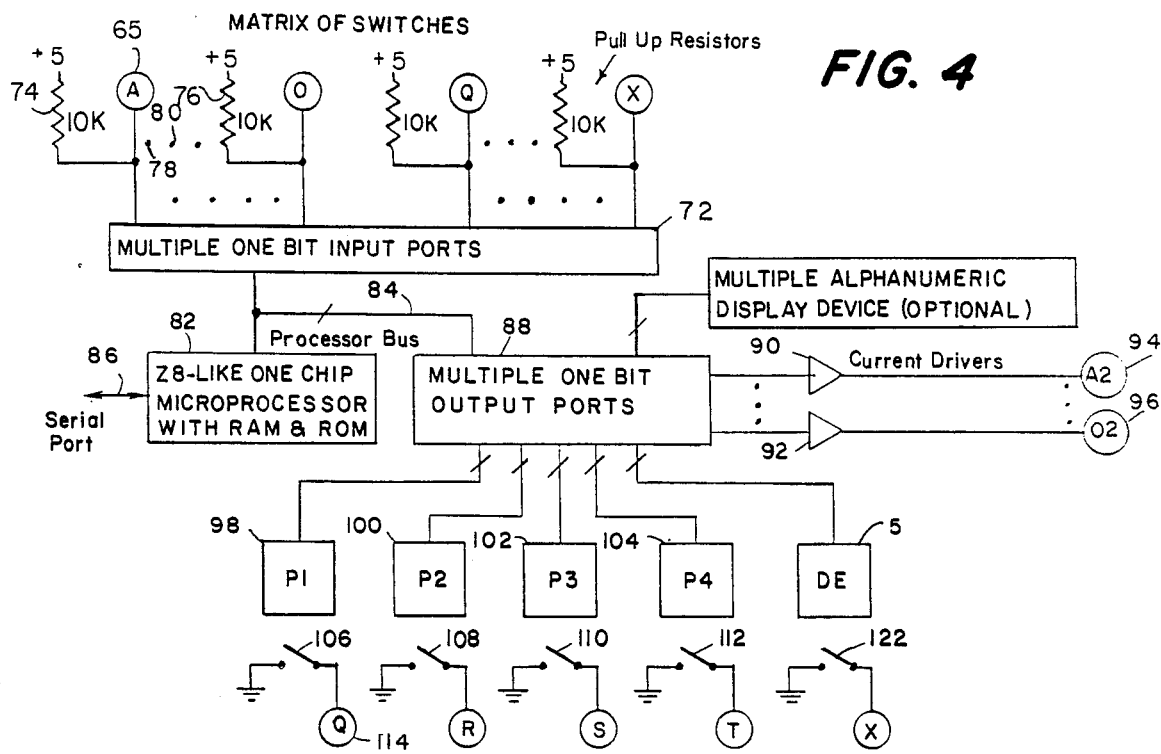
FIGS. 4 and 5 are schematic circuit diagrams of the circuitry of the keyboard of the present invention.

Each of the bars 6 through 36 has an associated switch such as switches 64 and 66 shown in FIG. 2. One side of each of these switches is connected to ground while the other side is connected to one of the input terminals A through O. These input terminals A through O are the input terminals to multiple one bit input ports 72, shown in FIG. 4. Each of the input terminals such as shown by input terminals 65 in FIGS. 2 and 4 is coupled to ports 72 and also to a five volt source through a 10k ohm pull-up resistor. When the switch associated with the input terminal is not closed, e.g. when switch 64 is open so that terminal 65 is not connected to ground then the input terminal associated with input A of ports 72 is biased by the five volts through resistor 74. However, when switch 64 is closed so as to connect terminal 65 of input A to ground then the input of A to ports 72 is grounded thereby providing an input signal through one bit input port 72 which in turn can be provided to a microprocessor 82. Similarly each of the input terminals A through X, shown in FIG. 4 has a corresponding pull-up resistor such as resistors 74 and 76. While only four input terminals have been shown with letter designations and the five volt bias and the 10k ohm pull-up resistor, each of the input terminals is connected to an appropriate input of multiple one bit input port 72 such as through terminals 78 and 80.

Figure 3:
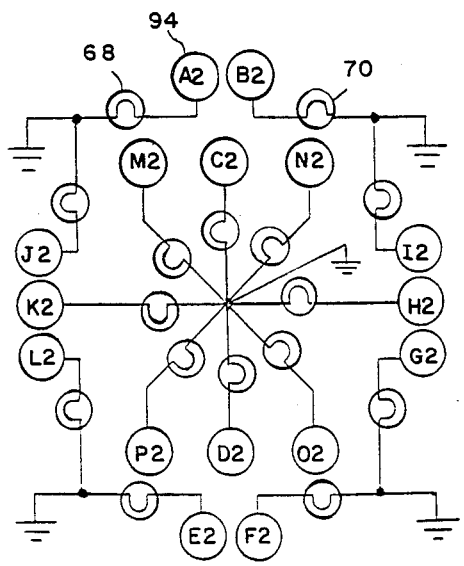
FIG. 3 is a schematic view of the backlights provided behind each of the bars of the key of the keyboard of the present invention.

The signals from multiple one bit input port 72 are supplied to a microprocessor 82. This microprocessor can be a Z8 one chip microprocessor which has its own built-in RAM and ROM. The microprocessor 82 also is connected through a processor bus 84 to multiple one bit output ports 88. In addition, the microprocessor 82 is connected to a modem or to a computer direct connection through a serial port 86. Output signals are provided by the multiple one bit output ports to a series of current drivers such as current drive amplifiers 90 and 92 which in turn are each coupled to a light emitting member associated with each of the bars of key 4. These light emitting members are represented in FIG. 3 by light bulbs such as bulbs 68 and 70. The outputs A2 through D2 are coupled as output terminals such as 94 and 96 to the inputs of the light bulbs for providing current for turning on the light bulbs shown in Figure 3. Each of the light bulbs in FIG. 3 when activated then shines a light through the corresponding bar of key 4 so that a character pattern is formed by the lit bars.

In addition, the multiple one bit output ports provide a series of output signals to display members P1 through P4 which are designated as members 98, 100, 102 and 104, respectively. These display members display the best guess characters which guesses are determined by the microprocessor 82. If one of these characters is the particular character that the user of keyboard system 2 intends to form then such user can close the appropriate corresponding switch of switches 106, 108, 110 and 112 which provides an output signal on the appropriate output terminal such as terminal 114. Activation of one of these output terminals then provides a signal through multiple one bit input ports to microprocessor 82 which in turn supplies the selected character to the computerized system through serial port 86. In addition, data entry key 5 has an associated switch 122 for entering the actual character displayed by key 4.

Figure 5:
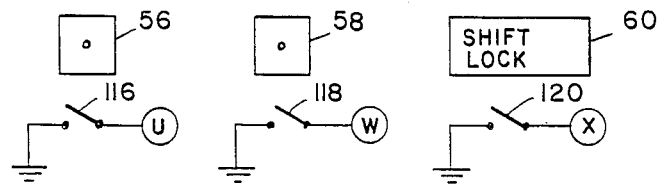

In a similar manner, each of the punctuation keys, 56 and 58, and the shift/lock 60 has an associated switch, switches 116, 118 and 120, respectively, shown in FIG. 5. When each of the switches is closed then an appropriate input signal is supplied to multiple one bit input ports 72 indicating that such switch has been closed.

Figure 6:
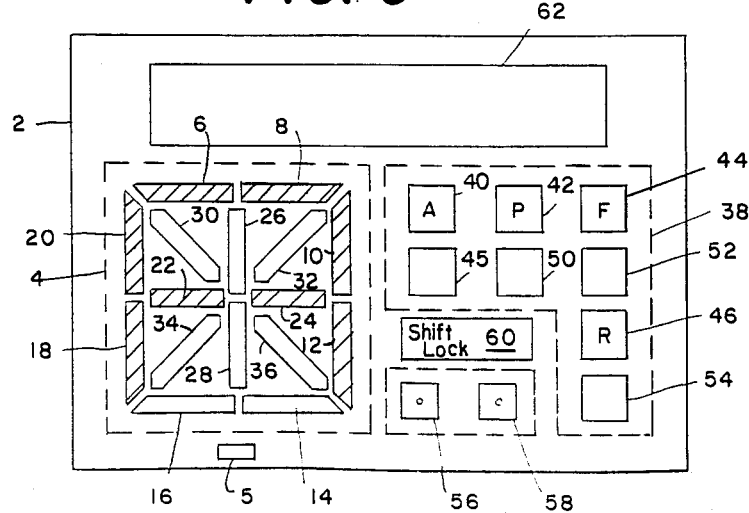
FIG. 6 is a front plan view of the keyboard as shown in FIG. 1 except that some of the bars are lit as they would be in operation and four best guess characters are displayed on the keyboard.

In FIG. 6 a series of lit bars are shown on key 4. As shown in this FIGURE, bars 6, 8, 10, 12, 18, 20, 22 and 24 are lit. When these bars are lit then microprocessor 82 could analyze such lit bars and provide an indication on displays 40, 42, 44 and 46 of the best guesses of the particular character that the user intends to form. As an example, display 40 shows an A, display 42 a P, display 44 a F and display 46 a R. The user then can activate one of the data entry keys under these four displays so as to select one of these four displayed characters and enter such character if the displayed character is the character that the user intended to form.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

What is claimed is:

1. A compact keyboard for entry of alphanumeric data into a computerized system comprising:

a character formation key formed by a plurality of bars capable of being activated for providing light, said bars being arranged in a mosaic pattern with several of said bars forming an outer box pattern and several of said bars extending inside of said box pattern;

means for causing light to be emitted from each said bar when such bar is in an activated lit condition;

each of said bars being switchable between an activated lit condition and an off condition, with the activated ones of said bars emitting light so as to display an alphanumeric character;

each of said bars being switchable between its activated and its off conditions by a user, and, entry means for causing a displayed alphanumeric character to be entered into a computerized system, said entry means further including confirming means for confirming characters input by a user prior to entry into the computer, said confirming means comprising:
  separate character display means,
  means for displaying on said separate character display means a decoded alphanumeric character being formed by the user based on which of said bars are in an activated lit condition, and
  a separate data entry means associated with said separate character display means so that if said separate character display means displays the alphanumeric character that a user intends to form by said bars such user can enter the desired alphanumeric character by pressing said separate data entry means.

2. A keyboard according to claim 1 wherein each of said bars is switchable between its activated and its off conditions by a user activating each individual said bar.

3. A keyboard according to claim 2 further comprising initiating means for causing the normal conditions of at least several of said bars to be activated conditions thereof in which said normally activated bars emit light so that when entering characters on said keyboard a user activates selected said normally activated bars to turn off their lights and wherein said entry means includes reinitiating means for causing said initiating means to return said bars to their normal conditions after an alphanumeric character has been entered.

4. A keyboard according to claim 3 wherein said initiating means causes all of said bars to be normally lit.

5. A keyboard according to claim 3 wherein said initiating means causes said bars forming said outer box pattern to be normally lit.

6. A keyboard according to claim 5 wherein several of said bars extend along a horizontal line across said outer box pattern and said initiating means causes said horizontally extending bars to be normally lit.

7. A keyboard according to claim 1 further comprising a plurality of said separate character display means, and analyzing means for analyzing a pattern of said lit bars as said keyboard is used and displaying n said plurality of separate character display means alphanumeric characters being formed by the user based on which of said bars are in an activated lit condition and a plurality of separate data entry means respectively associated with each of said separate character display means so that if one of said separate character display means displays the alphanumeric character that a user intends to form by said bars even though such user has not yet completed forming such alphanumeric character on said bars such user can enter the desired alphanumeric character by pressing the appropriate one of said separate data entry means.

8. A keyboard according to claim 7 wherein said analyzing means determines the most likely alphanumeric characters dependent upon which of said bars are lit and upon a probability factor as to which alphanumeric characters are the most likely to occur in the data being entered by the user of said keyboard.

9. A keyboard according to claim 7 wherein there are four separate character display means and each of said character display means is capable of generating a lit display of an alphanumeric character.

10. A keyboard according to claim 7 wherein said analyzing means generates a new set of alphanumeric characters to be displayed on said plurality of separate display means each time the condition of any of said bars is changed by a user so that the displays of the most likely characters is constantly updated each time a user activates another of said bars so as to change the condition of such bar.

11. A keyboard according to claim 10 wherein there are four separate character display means and each of said character display means is capable of generating a lit display of an alphanumeric character.

12. A keyboard according to claim 11 further comprising primary display means for displaying the alphanumeric characters being entered by said keyboard into a computerized system.

13. A keyboard according to claim 3 wherein each of said bars has an associated backlighting means for generating a light behind said bar that shines through said bar.

14. A keyboard according to claim 12 wherein each of said bars has an associated backlighting means for generating a light behind said bar that shines through said bar.

15. A keyboard according to claim 1 further comprising punctuation generating means for causing said separate display means to display a plurality of different punctuation marks so that a user can select one of said separate entry means for entering a desired punctuation mark.

16. A keyboard according to claim 12 further comprising punctuation generating means for causing said separate display means to display a plurality of different punctuation marks so that a user can select one of said separate entry means for entering a desired punctuation mark.

17. A keyboard according to claim 16 further comprising shift means for shifting the alphanumeric characters being entered between upper and lower case characters.

18. A keyboard according to claim 3 wherein there are sixteen of said bars.

19. A keyboard according to claim 1 further comprising multiple one bit input means coupled to each of said bars, said entry means and said separate data entry means for entering input signals in response to activation of each said bar and each said entry means by a user.

20. A keyboard according to claim 19 wherein said analyzing means includes microprocessing means coupled to the output of said multiple one bit input means for receiving the single bit input signals and processing such signals and said microprocessing means providing output signals for causing light to be emitted from the activated said bars and for alphanumeric characters to be displayed on said separate character display means.

21. A compact keyboard for entry of character data into a computerized system comprising:
a character formation key formed by a plurality of bars capable of being activated for providing light, said bars being arranged in a mosaic pattern;
means for causing light to be emitted from each said bar when such bar is in an activated lit condition;
each of said bars being switchable between an activated lit condition and an off condition, with the activated ones of said bars emitting light so as to display a character; and,
entry means for causing a displayed character to be entered into a computerized system,
each of said bars associated with respective switch means in the vicinity thereof, said switch means switchable by a user between on and off conditions thereof, and means for activating and deactivating said bars in response to switching said respective switch means between said on and off conditions,
said entry means further comprising confirming display means for displaying a character being formed by the user based on which of said bars are in an activated lit condition.

22. A keyboard according to claim 21 wherein said confirming display means comprises a plurality of separate character display means, analyzing means for analyzing a pattern of activated said bars as said keyboard is used and displaying on said plurality of separate character display means the most likely alphanumeric character being formed by the user based on which of said bars are activated and a plurality of separate data entry means associated with each of said separate character display means so that if one of said separate character display means displays the alphanumeric character that a user intends to form by said bars even through such user has not yet completed forming such alphanumeric character on said bars such user can enter the desired alphanumeric character by pressing the appropriate one of said separate data entry means.

23. A keyboard according to claim 22 wherein said analyzing means generate a new set of alphanumeric characters to be displayed on said plurality of separate display means each time the condition of any of said bars is changed by a user so that the displays of the most likely characters are constantly updated each time a user contacts another of said bars so as to change the condition of such bar.

24. A keyboard according to claim 23 further comprising primary display means for displaying the alphanumeric characters being entered by said keyboard into a computerized system.

25. A keyboard according to claim 22 further comprising punctuation generating means for causing said separate display means to display a plurality of different punctuation marks so that a user can select one of said separate entry means for entering a desired punctuation mark.

26. A keyboard according to claim 25 further comprising shift means for shifting the alphanumeric characters being entered between upper and lower case characters.

27. A keyboard according to claim 21 wherein there are sixteen of said bars.

28. A keyboard according to claim 22 further comprising multiple one bit input means coupled to each of said bars, said entry means and said separate data entry means for entering single input signals in response to activation of each said bar and each said entry means by a user.

29. A keyboard according to claim 28 wherein said analyzing means includes microprocessing means coupled to the output of said multiple one bit input means for receiving the single bit input signals and processing such signals and said microprocessing means providing output signal for causing light to be emitted from the activated one of said bars and for alphanumeric characters to be displayed on said separate character display means.

30. A keyboard according to claim 29 wherein there are sixteen of said bars.

31. A compact keyboard for entry of data into a computerized system comprising:
   a character formation key formed by a plurality of bars capable of being activated for providing light, said bars being arranged in a mosaic pattern;
   means for causing light to be emitted from each said bar when such bar is in an activated lit condition;
   each of said bars being switchable between an activated lit condition and an off condition, with the activated ones of said bars emitting light so as to display a character; and,
   entry means for causing a displayed character to be entered into a computerized system,
   each of said bars being switchable between its activated and its off conditions by a user,
   said entry means further comprising separate character display means, means for displaying on said separate character display means a character being formed by the user based on which of said bars are in an activated lit condition, and a separate data entry means associated with said separate character display means so that if said separate character display means displays the character that a user intends to form by said bars such user can enter the desired character by pressing said separate data entry means.

32. A keyboard according to claim 31 wherein each of said bars is switchable between its activated and its off conditions by a user activating each individual said bar.

33. A keyboard according to claim 32 further comprising initiating means for causing the normal conditions of at least several of said bars to be in their activated conditions in which said normally activated bars emit light so that when entering characters on said keyboard a user activates selected said normally activated bars to turn off their lights and wherein said entry means includes reinitiating means for causing said initiating means to return said bars to their normal conditions after a character has been entered.

34. A keyboard according to claim 33 wherein said initiating means causes all of said bars to be normally lit.

35. A keyboard according to claim 31 further comprising a plurality of said separate character display means, and analyzing means for analyzing a pattern of said lit bars as said keyboard is used and displaying on said plurality of separate character display means characters being formed by the user based on which of said bars are in an activated lit condition and a plurality of separate data entry means respectively associated with each of said separate character display means so that if one of said separate character display means displays the character that a user intends to form by said bars even though such user has not yet completed forming such character on said bars such user can enter the desired character by pressing the appropriate one of said separate data entry means.

36. A keyboard according to claim 35 wherein said analyzing means generates a new set of characters to be displayed on said plurality of separate display means each time the condition of any of said bars is changed by a user so that the displays of the most likely characters is constantly updated each time a user activates another of said bars so as to change the condition of such bar.

37. A keyboard according to claim 7 wherein said analyzing means comprises means for displaying on said separate character display means the most likely alphanumeric characters being formed by the user.

38. A keyboard according to claim 35 wherein said analyzing means comprises means for displaying on said separate character display means the most likely characters being formed by the user.

39. A compact keyboard for entry of data into a computerized system comprising:
   a character formation input key means including:
   a plurality of display segments each having an active and an inactive state, said display segments combinable by selective activation to form a character;
   activating means for activating and deactivating separate ones of said display segments to form said character;
   first entry means for causing a character displayed by said segments to be entered into a computerized system,
   separate display means, separate from said plurality of display segments, responsive to a character-forming sequence of operations of said activating means by displaying for user verification, after each operation in said sequence, at least one complete character corresponding to the ones of said display segments activated during said sequence, and
   separate entry means associated with said separate display means for verifying a complete character displayed on said separate display means and for causing the complete character to be entered into the computerized system,
   thereby terminating said character-forming sequence is prior to completion for the character being formed.

40. A compact keyboard as recited in claim 39 wherein said separate display means comprises a plurality of displays, each displaying a different complete character, and wherein said separate entry means comprises a plurality of entry means respectively associated with said plurality of displays for providing to a user a plurality of possible characters for verification and for early termination of the character-forming sequence.

41. A compact keyboard as recited in claim 39 further comprising initiating means for initiating said plurality of display segments to a predetermined initial display condition after termination of the character forming sequence and upon initial activation of the keyboard, said predetermined initial display condition selected for requiring a reduced number of operations in a sequence to form a commonly input character.

* * * * *